United States Patent
Whalen

[11] Patent Number: 5,946,143
[45] Date of Patent: Aug. 31, 1999

[54] DYNAMIC ABERRATION CORRECTION OF CONFORMAL/ASPHERIC DOMES AND WINDOWS FOR MISSILE AND AIRBORNE FIRE CONTROL APPLICATIONS

[75] Inventor: Michael R. Whalen, Tucson, Ariz.

[73] Assignee: Raytheon Company, Lexington, Mass.

[21] Appl. No.: 09/073,088

[22] Filed: May 5, 1998

[51] Int. Cl.$^6$ .............................. G02B 3/06; G02B 17/00
[52] U.S. Cl. ............................................ 359/728; 359/711
[58] Field of Search .................................. 359/557, 710, 359/711, 728, 729, 731

[56] References Cited

U.S. PATENT DOCUMENTS

| | | | |
|---|---|---|---|
| 2,121,567 | 6/1938 | Newcomer | 359/669 |
| 3,822,932 | 7/1974 | Humphrey | 351/222 |
| 5,136,418 | 8/1992 | Itabashi | 359/218 |
| 5,307,208 | 4/1994 | Hofbauer et al. | 359/710 |

*Primary Examiner*—Cassandra Spyrou
*Assistant Examiner*—Mark A. Robinson
*Attorney, Agent, or Firm*—Andrew J. Rudd; David W. Collins; Glenn H. Lenzen, Jr.

[57] ABSTRACT

An optical correction technique which utilizes a pair of toroidal optical elements which are translated axially to provide dynamic correction of astigmatic aberrations induced by conformal/aspheric domes and windows as a function of sensor gimbal angle. This correction technique provides dual axis, variable optical power correction within the dynamic operation of gimballed optical sensors, and is particularly suited to correction of aberrations introduced by conformal/aspheric domes and windows used in both missile and airborne fire control systems.

18 Claims, 3 Drawing Sheets

DYNAMIC ABERRATION CORRECTION OF CONFORMAL/ASPHERIC DOMES AND WINDOWS FOR MISSILE AND AIRBORNE FIRE CONTROL APPLICATIONS

TECHNICAL FIELD OF THE INVENTION

This invention relates to a technique to dynamically correct the varying amount of astigmatism introduced to an optical sensor by a conformal/aspheric dome or window in missile and/or airborne fire control systems.

BACKGROUND OF THE INVENTION

Conventional optical sensors utilize spherical domes and flat windows in order to facilitate optical design, aberration correction, enhanced imaging quality, hardware fabrication and interferometric acceptance testing. As used herein, the term "conformal" optics describe optical systems that are designed with the operational environment as the primary consideration and the optical imaging properties as a secondary concern. As a result, conformal domes and windows for missile and airborne fire control systems are driven by aerodynamic performance issues, e.g. decreased aerodynamic drag, increased missile velocity and extended operational range, and result in highly aspheric dome geometries that are more elongated in shape.

A major disadvantage of these highly aspheric surfaces is the large aberrations they produce in the transmitted optical wavefront. In addition, the inherent asymmetry of conformal surfaces leads to variations in the aberration content presented to the optical sensor as it is gimballed across the field of regard. These two factors degrade the sensor's ability to properly image targets of interest and hence undermine the overall system performance. Consequently, the aerodynamic advantages of conformal domes and windows cannot be realized in practical systems unless dynamic aberration correction techniques are developed to restore adequate optical imaging capabilities. As a result, no known operational missile system currently employs a conformal dome in combination with an optical sensor system.

It is acknowledged that the use of cylindrical elements for astigmatic correction is commonplace in the optical industry. It is also acknowledged that the separation between optical elements is a powerful variable for achieving desired optical performance. However, no prior art applies dynamic axial translation of cylindrical elements to correct varying aberrations resulting from conformal/aspheric domes and windows in missile and airborne fire control applications.

It would therefore represent an advance in the art to provide a technique for optically compensating the variable aberrations introduced by conformal domes/windows.

SUMMARY OF THE INVENTION

In accordance with an aspect of the invention, an optical correction technique is described which utilizes a pair of toroidal optical elements which are translated axially to provide dynamic correction of astigmatic aberrations induced by conformal/aspheric domes and windows as a function of sensor gimbal angle. This correction technique provides dual axis, variable optical power correction within the dynamic operation of gimballed optical sensors, and is particularly suited to correction of aberrations introduced by conformal/aspheric domes and windows used in both missile and airborne fire control systems.

Conformal/aspheric domes and windows have not been utilized in previous missile and airborne fire control systems due to the large magnitude and varying nature of the aberrations they introduce to the optical sensor. One purpose of this invention is to dynamically correct the varying amount of astigmatism introduced to an optical sensor by a conformal/aspheric dome or window in missile and/or airborne fire control systems. This invention will greatly improve optical imaging capabilities through such aberrated surfaces and hence allow the use of conformal/aspheric domes and windows in operational missile and airborne fire control hardware. Conformal shapes have less aerodynamic drag than conventional flat windows or spherical domes and therefore will allow the missiles and/or aircraft to fly faster and/or further on less fuel than current technology permits. The use of conformal domes and windows will also allow the optical sensor to have a larger unvignetted field of regard as well as reduced vignetting at sensor gimbal positions where vignetting is unavoidable.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The aberration correction technique in accordance with this invention addresses the dynamic correction of astigmatism as the sensor is gimballed through the field of regard, and consequently, images through varying subapertures of the conformal dome or window. Astigmatism can be defined as a difference in optical power in the tangential and sagittal planes, resulting in two separated line foci. It is well known that a cylindrical element, i.e. a lens having a front cylindrical face and a flat back surface, and having only single axis power, can be introduced to provide single axis power compensation to balance the relative mismatch in focal lengths. In a conformal system however, the required amount of cylindrical compensation must vary with respect to gimbal position. As it is impractical to physically exchange cylindrical elements of varying power in a real system, a method of effecting dynamic power adjustments using a single pair of static correction elements is highly desirable. This can be achieved, in accordance with the invention, through axial translation of two crossed toroidal optical elements, wherein each toroidal element provides different optical power in two directions (X and Y).

Figure 1:
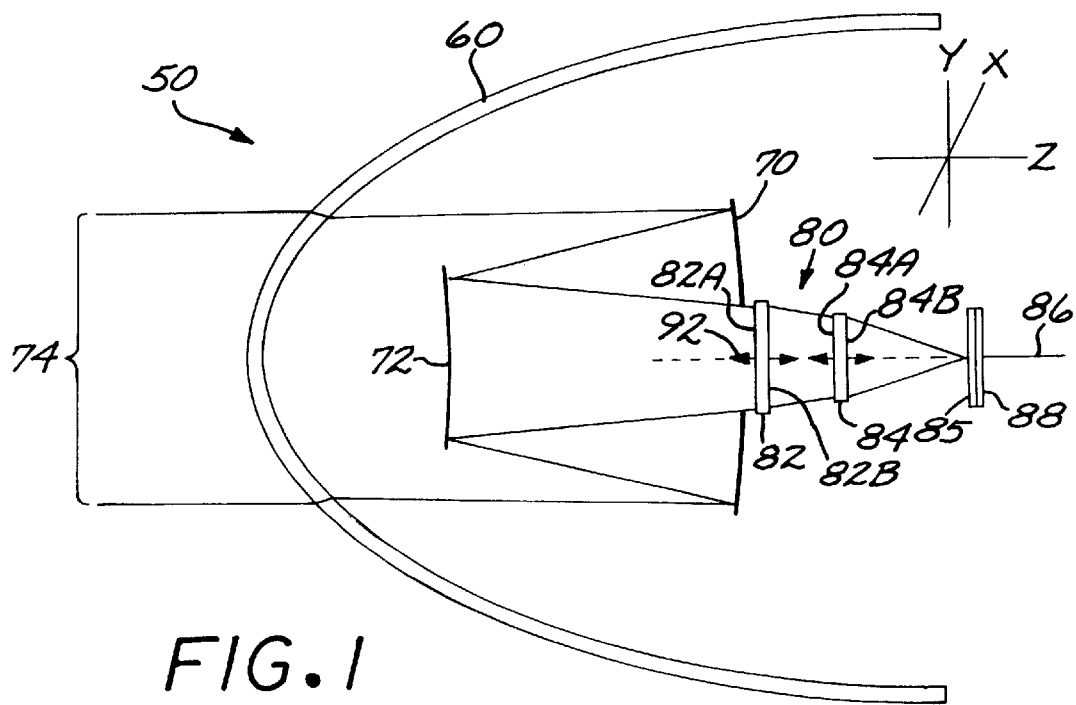
FIG. 1 is a simplified schematic diagram of a conformal dome and optical sensor system in accordance with the invention.

FIG. 1 illustrates a notional conformal dome and optical sensor system 50 embodying the invention. The system 50 includes a conformal dome 60 fabricated of a material which transmits therethrough an electromagnetic wave front. By way of example only, the system 50 can be adapted to operate at the infrared spectrum. The dome 60 can be fabricated of sapphire in this example, although for sensors operating at other spectral ranges, some other material will be suitable. In this exemplary embodiment, the dome 60 is mounted at the forward end of an airborne missile.

The system 50 further includes, in this exemplary embodiment, a primary mirror 70 and a secondary mirror 72 which directs the image light onto the correction system 80 for focussing at the image plane 85. Typically, a planar sensor array 88 is disposed at the image plane for producing images. The mirrors 70 and 72 establish the field of view, indicated generally by reference 74 for the optical system. The mirrors 70 and 72 are exemplary of many different types of optical subsystems which could alternatively perform the function of establishing the field of view. For example, optical lenses could alternatively be employed in particular applications.

Figure 2:
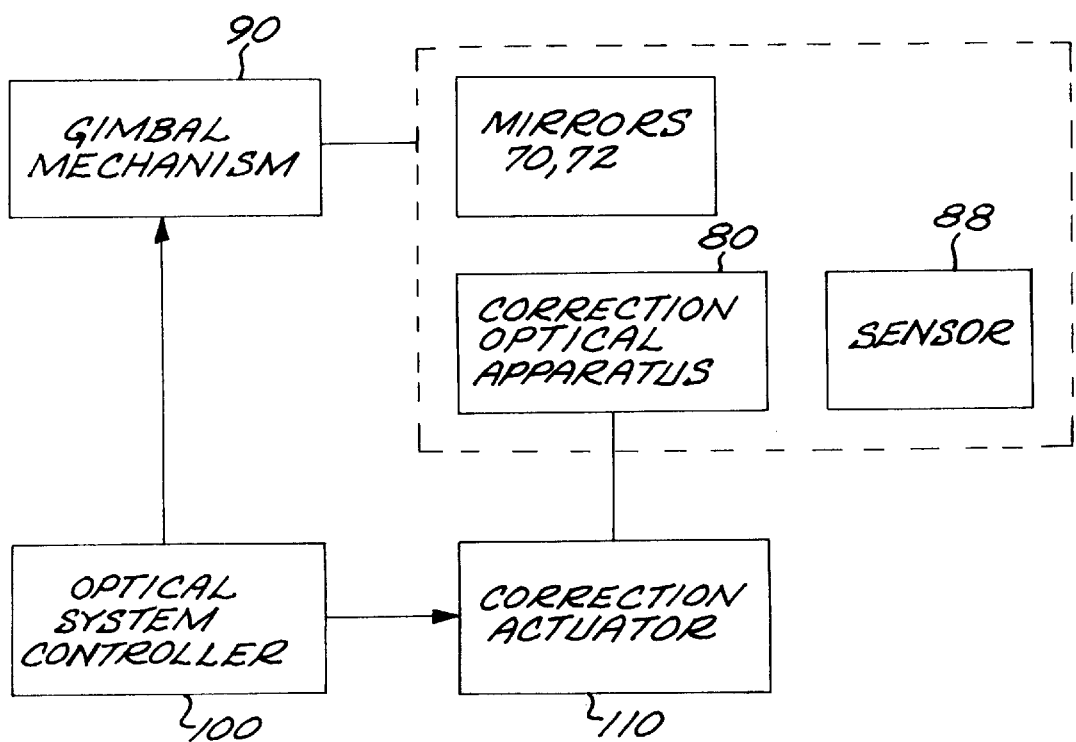
FIG. 2 is a schematic block diagram of the optical, actuator and control elements of the system of FIG. 1.

The correction system 80 includes a first optical toroidal element 82 and a second optical toroidal element 84, each of which is independently translatable along the axis 86 by a correction actuator mechanism 110 (FIG. 2). The toroidal elements have different optical power in both the X and Y directions, wherein X is horizontal, perpendicular to axis 86 (the Z direction) and to the plane of the figure, i.e. perpendicular to the sheet of paper on which FIG. 1 appears. Y is the vertical direction, perpendicular to the axis 86 and the X axis. The first toroidal element 82 provides static correction in one direction, e.g the Y direction, while the varying axial separation of the two elements 82, 84 allows the ray height on the second toroidal element 84, and hence the effective power correction in the orthogonal direction (X), to be controlled. In this manner, the two astigmatic line foci generated by the inherent astigmatism in the conformal dome or window 60 can be reconciled at any gimbal position about exemplary gimbal pivot point 92 through an appropriate selection of correction element geometry. The required axial motion can be achieved with standard optical mounts and sensor housings via traditional zoomed or cam-type mechanical subsystems.

In general, the two toroidal elements are part of a correction system wherein the sum of the optical powers of both elements imparts a different power in X and Y, which provides correction for the aberrations introduced by the dome 60. Further, in order for the axial translation to have the desired effect, each individual toroidal element provides optical power in X and Y.

In an exemplary embodiment, the two toroidal elements 82, 84 include respective crossed cylindrical surfaces. Thus, element 82 is an optical element having a front surface 82A and a rear surface 82B. The front surface 82A is a cylindrical surface whose longitudinal axis is parallel to the X axis, and thus provides optical power only along the Y axis. The back surface 82B is a toroidal surface, such as a spherical surface, which provides power in both X and Y directions. Similarly, element 84 is an optical element having a front surface 84A and a rear surface 84B. The front surface 84A is a cylindrical surface whose longitudinal axis is parallel to the Y axis, and thus provides optical power only along the X axis. The back surface 84B is a toroidal surface, such as a spherical surface, which provides power in both X and Y directions.

FIG. 2 illustrates in schematic fashion the system 50. The mirrors 70, 72, the optical correction apparatus 80, and the sensor 88 are supported for gimballed movement about the gimbal point 92. A gimbal mechanism 90 includes a positioning mechanism to move these elements in response to positioning commands from a controller 100. This provides the capability of positioning the sensor 88 through a range of fields of view. The whole field of coverage of the field of view as the mirrors and sensor are gimballed through the gimbal range of movement defines the field of regard of the system.

To provide optical compensation for aberrations introduced by the conformal dome 60, as the sensor is positioned at different positions, the controller 100 provides correction commands to the correction actuator 110 to translate the first crossed cylinder 82 and the second crossed cylinder 84 along the axis 86 to predetermined positions corresponding to the gimbal position. These cylinder positions are preselected to compensate for optical aberrations introduced by the dome 60 at the particular gimbal position.

Figure 3:
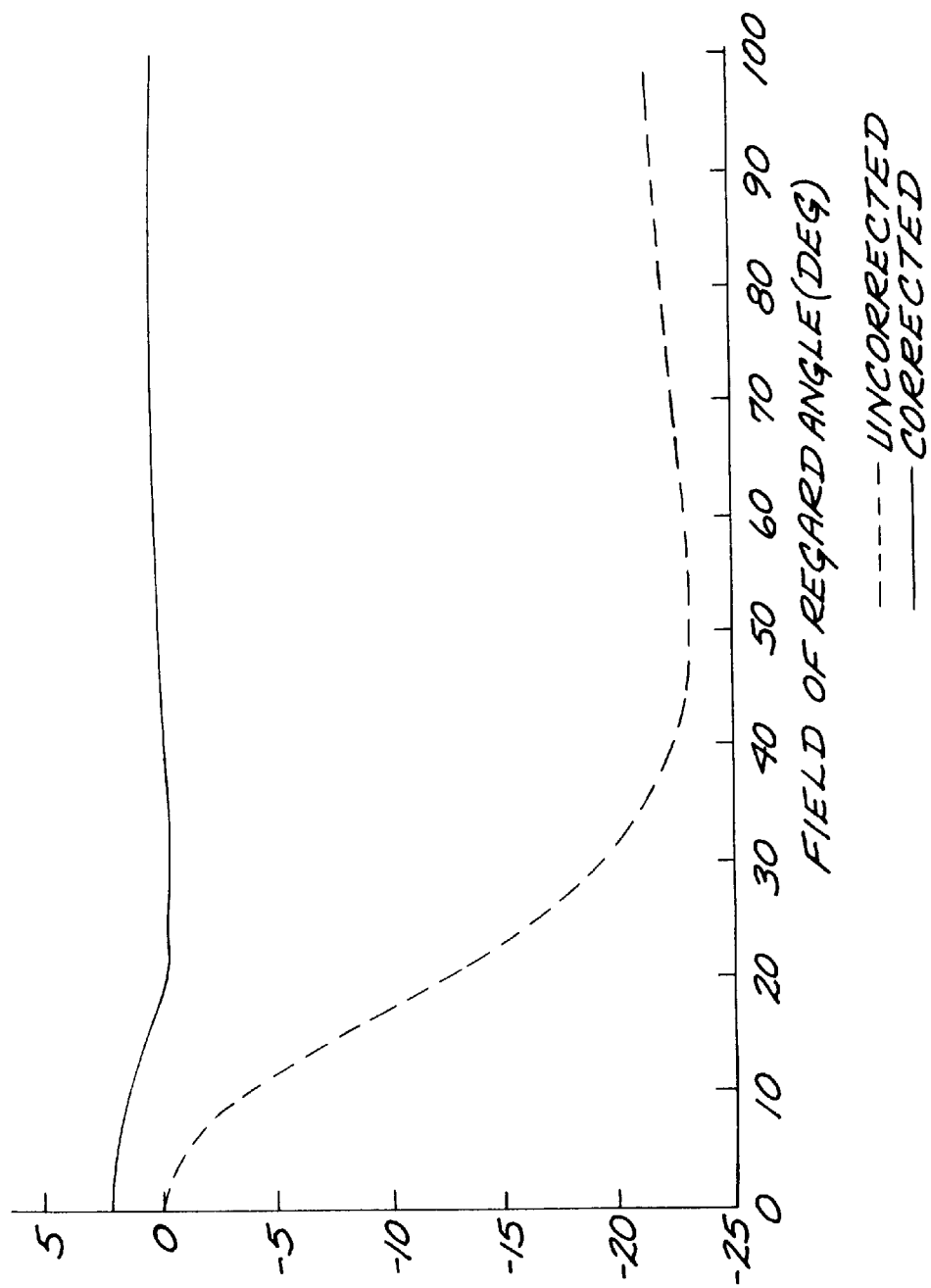
FIG. 3 shows in a graphical form a comparison of a nominal, uncorrected conformal missile dome and the same conformal dome in conjunction with the axially translating, crossed cylinder dynamic correction technique in accordance with the invention.
Figure 4:
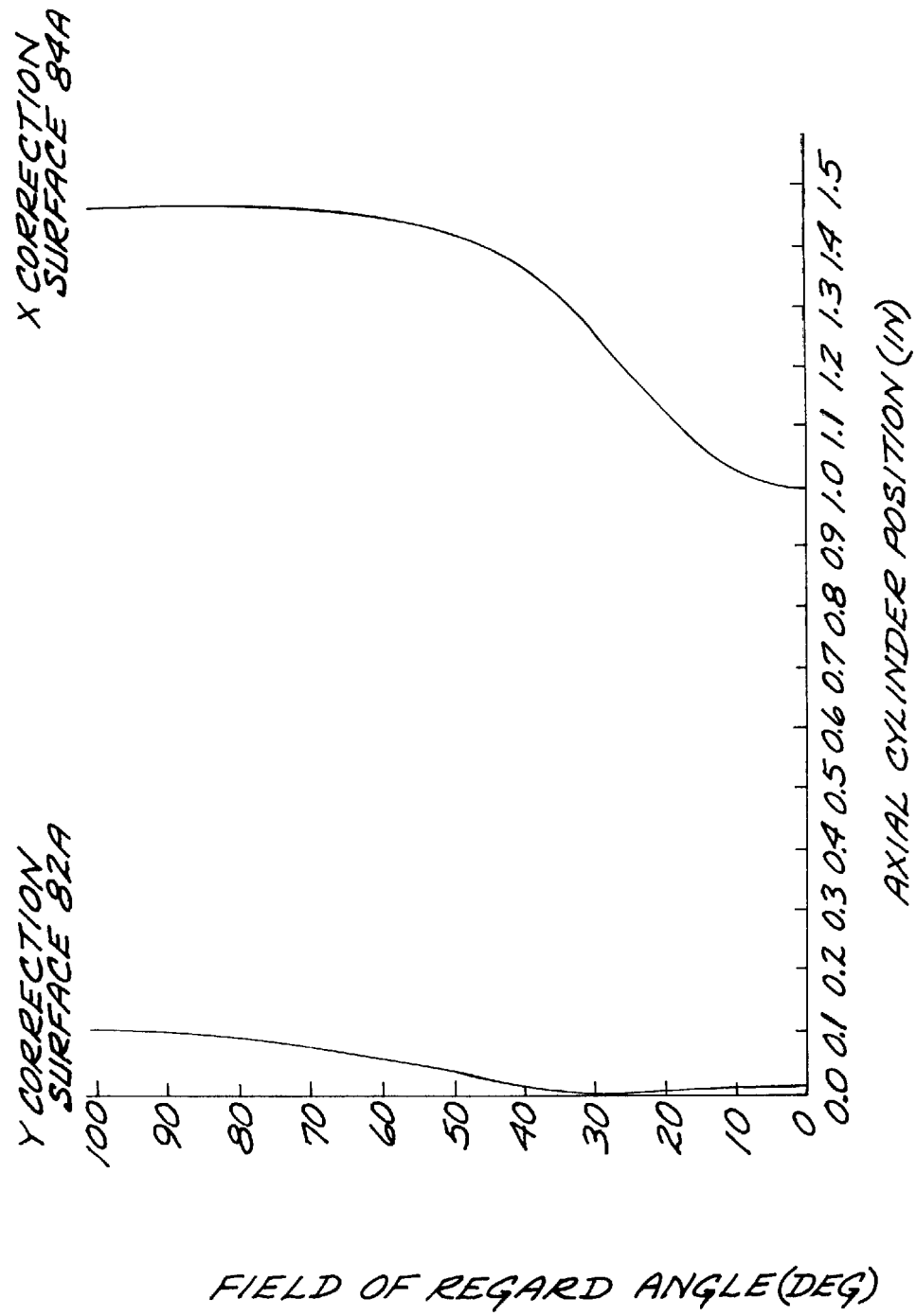
FIG. 4 displays the axial positions of the two cylinders relative to the primary mirror as a function of field of regard, documenting the axial translations required for correction in the example of FIG. 3.

To verify the effectiveness of this correction technique, Code V, a commercially available optical design and analysis software package, was utilized to generate simulation plots of the astigmatism induced by a conformal dome as a function of field of regard. FIG. 3 presents simulated data generated by the software package, and shows a comparison of third order astigmatism for a nominal, uncorrected conformal missile dome and the same conformal dome in conjunction with the axially translating crossed cylinder dynamic correction technique. The dynamic correction technique provides a significant improvement by reducing the magnitude of the peak astigmatism from nearly 24 waves to approximately 2 waves, with near perfect correction at field of regard angles greater than 20 degrees. FIG. 4 displays the simulated axial positions of the two cylinders 82, 84 relative to the primary mirror 70 as a function of field of regard for the example of FIG. 3, illustrating the simulated axial translations required for the corrections.

It is important to note that the notional conformal dome and optical sensor system shown in FIG. 1, the level of aberration correction shown in FIG. 3 and the axial cylinder motion shown in FIG. 4 collectively represent only a single point example of the utility of the more general aberration correction technique. The axially translating cylinder dynamic correction technique is applicable to many types of optical systems, including reflective, refractive and catadioptric designs, and can incorporate a wide variety of toroidal and cylindrical elements, including those with aspheric or off-axis spherical surfaces, to aid in the overall correction capability. In addition, the toroidal elements when moved axially can also be used for focus shifting functions, in addition to the function of astigmatism correction.

This invention will facilitate the utilization of conformal domes and windows in operational missile and airborne fire control system hardware. Conformal domes and windows have reduced aerodynamic drag and will allow missiles and/or aircraft to fly faster and/or further on less fuel than current technology permits. In addition, the relative simplicity of this optical correction technique will provide a significant cost advantage over other correction methodologies that incorporate more complex optical components, optical mounts and/or optical element motions.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A dynamic optical correction system for correcting dynamically varying astigmatic aberrations, comprising:

first and second toroidal elements arranged on an axis, wherein each of said first and second toroidal elements provides optical power in first and second orthogonal directions transverse to said axis; and a dynamic actuator system for providing relative axial translation of said first and second toroidal elements to vary the axial separation distance between said elements to provide dynamic optical correction of varying astigmatic aberrations.

2. The optical system of claim 1 wherein said axis is a linear axis.

3. The optical system of claim 1 wherein said first toroidal element is adapted to provide static optical correction in said first direction, and said dynamic actuator system is adapted to provide varying axial separation of said first and second toroidal elements to provide an effective power correction in said second direction.

4. The optical system of claim 1 wherein said first and second toroidal elements each comprise a front surface and a rear surface, and wherein the front surface of each toroidal element is a cylindrical surface and the rear surface is a toroidal surface, and wherein the front surface of said first toroidal element provides optical power along said first direction, and said front surface of said second toroidal element provides optical power along said second direction.

5. The optical system of claim 4 wherein the rear surface of each toroidal element is a spherical surface.

6. An optical system, comprising:

an aspheric dome or window structure, fabricated of a material which transmits incident wavefront energy in a spectral range;

a gimballed optical apparatus disposed within the dome/window structure and including a first optical system for directing energy incident through the dome structure within a field of regard toward an image plane, an optical correction system disposed in an optical path between the dome/window structure and the image plane, and a gimbal mechanism for gimballing the first optical system and the optical correction system through a range of movement; and wherein said optical correction system including first and second toroidal elements arranged on an axis, and a dynamic actuator system for providing relative axial translation of said first and second toroidal elements in dependence on the position of the gimballed optical apparatus to provide dynamic optical correction of optical aberrations introduced by the dome/window structure as the optical apparatus is gimballed through the field of regard.

7. The optical system of claim 6 wherein said axis is a linear axis.

8. The optical system of claim 6 wherein said first toroidal element is adapted to provide static optical correction in said first direction, and said dynamic actuator system is adapted to provide varying axial separation of said first and second toroidal elements to provide an effective power correction in said second direction.

9. The optical system of claim 6 wherein said first and second toroidal elements each comprise a front surface and a rear surface, and wherein the front surface of each toroidal element is a cylindrical surface and the rear surface is a toroidal surface, and wherein the front surface of said first toroidal element provides optical power along said first direction, and said front surface of said second toroidal element provides optical power along said second direction.

10. The optical system of claim 9 wherein the rear surface of each toroidal element is a spherical surface.

11. The optical system of claim 6 wherein said gimballed optical structure includes a sensor array disposed at said image plane.

12. The optical system of claim 6 further comprising a controller adapted to generate gimbal control signals for controlling the gimbal mechanism to position the first optical system and the optical correction system at positions within the range of movement, said controller further adapted to generate correction signals for controlling the dynamic actuator system to set the relative axial position of said first and second toroidal elements in dependence on the gimbal position.

13. The system of claim 6 wherein said first optical system includes a primary mirror and a secondary mirror.

14. An airborne missile sensor system, comprising:

an aspheric dome or window structure, fabricated of a material which transmits incident wavefront energy in a spectral range;

a gimballed optical apparatus disposed within the dome/window structure and including a first optical system for directing energy incident through the dome structure within a field of regard toward an image plane, an optical correction system disposed in an optical path between the dome/window structure and the image plane, a sensor array disposed at said image plane, and a gimbal mechanism for gimballing the first optical system and the optical correction system through a range of movement; and wherein said optical correction system including first and second toroidal elements arranged on an axis, and a dynamic actuator system for providing relative axial translation of said first and second toroidal elements in dependence on the position of the gimballed optical apparatus to provide dynamic optical correction of optical aberrations introduced by the dome/window structure as the optical apparatus is gimballed through the field of regard.

15. The sensor system of claim 14, wherein each of said first and second toroidal elements provides optical power in first and second orthogonal directions transverse to said axis.

16. The sensor system of claim 15 wherein said first toroidal element is adapted to provide static optical correction in said first direction, and said dynamic actuator system is adapted to provide varying axial separation of said first and second toroidal elements to provide an effective power correction in said second direction.

17. The sensor system of claim 14 wherein said first and second toroidal elements each comprise a front surface and a rear surface, and wherein the front surface of each toroidal element is a cylindrical surface and the rear surface is a toroidal surface, and wherein the front surface of said first toroidal element provides optical power along said first direction, and said front surface of said second toroidal element provides optical power along said second direction.

18. The sensor system of claim 14 further comprising an controller adapted to generate gimbal control signals for controlling the gimbal mechanism to position the first optical system and the optical correction system at positions within the range of movement, said controller further adapted to generate correction signals for controlling the dynamic actuator system to set the relative axial position of said first and second toroidal elements in dependence on the gimbal position.

* * * * *